Dec. 21, 1926.                                                    1,611,669
                          J. P. PERSCH
              APPARATUS FOR TREATING HYDROCARBON OILS
                        Filed Nov. 22, 1920
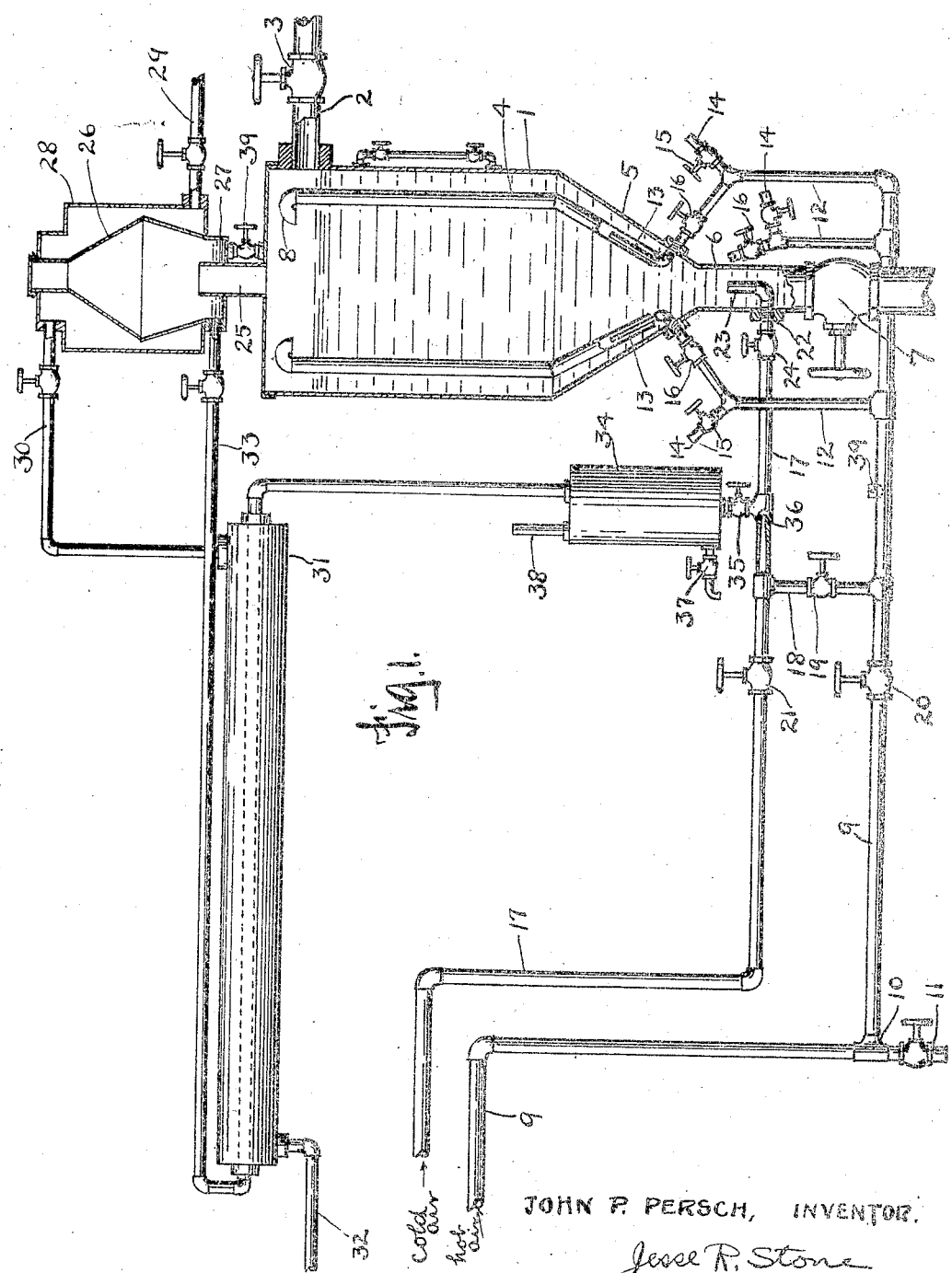
JOHN P. PERSCH, INVENTOR.
BY Jesse R. Stone
                HIS ATTORNEY.

Patented Dec. 21, 1926.

1,611,669

UNITED STATES PATENT OFFICE.

JOHN P. PERSCH, OF HOUSTON, TEXAS, ASSIGNOR TO MARTHA E. PERSCH, OF HOUSTON, TEXAS.

APPARATUS FOR TREATING HYDROCARBON OILS.

Application filed November 22, 1920. Serial No. 425,703.

My invention relates to an improvement in apparatus for treating petroleum and other hydro-carbon oils, the object being to render the oils more fluid.

The object of my invention is to provide an improved apparatus for the treatment of hydro-carbon oils by means of air at suitable temperatures so as to render the oils more fluid and mobile and thus better adapted for the pumping and spraying of the same for fuel purposes.

Another object is to provide an apparatus by means of which the temperature of the air used in treating the oil may be more efficiently and exactly regulated so that it will be of the desired temperature before it is introduced into contact with the oil to be treated.

Another object is to provide a more efficient condenser for receiving the volatile matter arising from the oil being treated and means to discharge the condensed volatile matter back into the mass of fluid under treatment. These and other objects will more clearly appear in the specification which follows.

Referring to the drawing forming a part of this specification, I have shown in the drawing an assembled view of the agitator and its connections whereby my improvements may be clearly understood.

In the drawing the numeral 1 refers to the agitating tank wherein the oil to be treated is introduced through an inlet pipe 2 at the upper end thereof, said pipe being controlled by a hand valve 3 thereon. In the interior of this tank I have shown a plurality of upright pipes 4 secured therein adjacent the walls of the tank 1. The tank is cylindrical in shape and is tapered downwardly at 5 toward the lower end thereof to connect with a discharge pipe 6, said discharge pipe being closed under ordinary circumstances by means of a valve 7. The pipes 4 within the tank are inclined toward the lower end to conform to the shape of the tank, the said lower ends being open. The upper ends of the said pipes 4 are recurved toward the upper end of the tank at 8 to discharge downwardly upon the material within the tank. As will be obvious the number of pipes 4 within the tank may be of any desired number, but I prefer to employ three, two of them being shown in the longitudinal section herewith.

In the treatment of the oil within the tank, it is my object to bring the total mass of oil into close and intimate contact with heated air or other similar fluid containing oxygen. The apparatus is, therefore, arranged to bring successively small portions of the mass of oil into contact with the air and to circulate the oil within the tank until the total mass has been treated. In performing this operation I introduce air at the proper temperature into the lower portion of the tank in such manner that it will be projected upwardly through the open-ended pipes 4 within the tank. The air to be used may be heated and forced through pipes into the tank in any preferred manner. It is understood that the air is compressed and forced through some heating means to the tank.

In the drawing I have shown a pipe 9, leading from a furnace or other heating means, not shown, to the agitating tank. At a point slightly removed from the tank I have provided a joint 10 having a valve-controlled outlet 11 thereon, by means of which the pipe may be cleared of water or other liquid accumulating within the pipe during the operation. The pipe 9, beyond this joint 10, is provided adjacent the tank with three branching discharge pipes 12. These discharge pipes are curved in such manner as to discharge into the tank on the tapered portion 5 thereof, at points closely adjoining the pipes 4. Within the tank the pipes 12 are provided with reduced nozzles 13 projecting upwardly a slight distance into the said pipes 4. Outside the tank I provide branching blow-off pipes 14 controlled by valves 15, these pipes furnishing a means for the escape of air from the pipes until the temperature of the said air has been properly regulated. Between the blow-off pipe 14 and the tank I also provide a hand-controlled valve 16 which may be closed when the blow-off pipe is opened.

Adjacent the hot air pipe 9 I have shown a pipe 17 for conducting cold air to the apparatus. This pipe is connected with the hot air pipe, at a point spaced slightly from the agitating tank, by means of a short connecting pipe 18. In this pipe I have provided a hand valve 19 for the regulation of the passage of air between the two pipes 9 and 17. Both the pipes 9 and 17 are provided with hand valves 20 and 21, respectively, on the side of the pipe 18 away from the agitating tank. The pipe 17 beyond the connecting pipe 18 is extended to project at 22 within the pipe 6 at the lower end of the agitating tank, as shown in the drawing. Within the pipe 6 the pipe 17 is curved upwardly ending in a nozzle 23 for discharging air upwardly into the material within the tank. The air thus introduced will bubble up through the mass of oil and cause a circulation of the oil in the pipe 6 to prevent the lodging of untreated oil in that portion of the tank. The entrance of the air from this pipe into the tank may be controlled by a hand-valve 24 immediately outside of the tank.

In the treatment of the oil by means of the heated air, volatile material separated from the mass of the oil will arise to the upper end of the tank along with the air used in treating the oil and will pass upwardly through an outlet pipe 25. To condense the volatile constituents in this escaping gas I provide a dome-shaped condenser 26 through which the pipe 25 will project upwardly a short distance, thus providing an annular pan or receptacle 27 between the walls of the condenser and the pipe 25. Outside the condensing chamber 26 is a cooling chamber 28 which provides between the walls of the chambers 26 and 28 a space for the circulation of the cooling liquid. This liquid is introduced through a valve-controlled pipe 29 toward the lower end thereof, the said cooling liquid passing outwardly at the upper end of the chamber 28 through the pipe 30. This pipe 30 serves to connect the chamber 28 with a second auxiliary cooling chamber 31. The said chamber 31 is preferably a length of pipe of large diameter through which the cooling liquid may circulate and be drawn out through an outlet pipe 32 at the opposite end from the inlet.

The volatile material condensed within the chamber 26 will run down the walls of the said chamber and collect in the container 27 at the lower end thereof and may then be run off through an outlet pipe 33 leading longitudinally through the cooling pipe 31 and from thence downwardly to a container 34 adapted to receive and collect the condensed material. At the lower end of the container 34 I have provided a so-called "sucker" or injector for drawing the condensed material from the container 34 and discharging it into the agitating tank. This sucker comprises a connection between the container and the pipe 17 through a valve-controlled pipe 35. At the point where the pipe 35 connects with the cold air pipe 17 I prefer to constrict the passage in pipe 17 somewhat, as shown at 36, so as to obtain a greater velocity of projection of the air in order to draw the condensed liquid from the container 34 and project it with some force through the discharge nozzle 23 into the agitating tank.

When it is desired to separate the volatile material from the mass of oil within the tank and to save the same, I have provided an outlet faucet or tap 37 through which the condensate may be drawn off. At the upper end of the container 34 I have provided an outlet pipe 38 for the escape of the used air.

In the operation of my device the oil to be treated is introduced into the tank through the pipe 2 until the level has reached the point desired. Air from the hot air pipe 9 is then turned on, the blow-off nozzles 14 being open and the valves 16 closed. At a point in the pipe 9 adjacent the discharge pipe 12, I provide a cup 39 projecting slightly into the pipe 9 and adapted to receive oil therein into which oil may be introduced a thermometer to ascertain the temperature of the air in the pipe. When the air has been discharged through the blow-off nozzles 14 until the pipes have been thoroughly cleaned and the temperature is found to be at the desired point, the blow-off nozzles are closed and the valves 16 opened. The heated air is then discharged into the tank. The discharge of the air through the nozzles 13 into the lower ends of the pipes 4 will act with an injector effect to draw the oil into the lower ends of the pipes 4 and carry it upwardly with the blast of air through the pipes and discharge it downwardly upon the upper surface of the oil in the tank. A circulation of the oil in the tank will thus be secured and in a short period of time the total mass of oil in the tank will have been circulated through the pipes 4 and be there acted upon thoroughly by its contact with the heated air. The action of the air upon the oil will be to break up the molecules in such manner that the oil will become more fluid. It is thought that the oxygen of the air will slightly oxydize the oil and that the complex hydro-carbon molecules will be recombined with the oxygen to form a more fluid and mobile mass, which rel. ains fluid after it becomes cold.

The valve 21 in the cold air pipe will ordinarily be closed when the temperature of the air is regulated in the pipe 9. The valve 19 in the connecting pipe will be open so that the air from the pipe 9 will also be discharged through the connecting pipe 18, the pipe 17 and the discharge nozzle 23 into the lower part of the tank. If, however, the temperature of the air rises beyond the desired point, the valve 21 in the cold-air pipe may be opened and thus allow a discharge of the cold air through the connecting pipe 18 to the pipe 9 so as to regulate the temperature thereof. With this arrangement, of course, the air may be shut off if desired from the discharge nozzle 23 by closing the valve 24, but if it is desired to continue the circulation through the pipe 17 this valve 24 may be opened, in which case the cold air discharged through the nozzle 23 will only serve to cause an agitation and circulation of the oil within the agitating tank.

The volatile matter passing upwardly with the used air through the pipe 25 will be condensed to some degree within the chamber 26 and will pass with the air through the pipe 33 to the auxiliary chamber 31 where it will be entirely condensed, the air and the liquid passing downwardly into the container 34 where the air will be allowed to escape through the outlet 38. The condensed liquid may then be discharged through the pipe 17 into the mass of oil in the tank, thereby making it still more fluid. If desired, however, the connection between the container 34 and the pipe 17 may be closed and the condensed volatile material drawn off through the outlet 37. If desired, a by-pass 39' may be provided between the condensing chamber 26 and the upper end of the agitating tank 1 to draw off a portion of the condensed volatile matter and allow it to pass immediately into the mass of oil in the tank. If this device is used, however, the condensed gas is not so efficiently mixed with the mass of oil and will more easily revaporize and pass off. It is, therefore, preferred to use the improvement herein described so that the condensed material may be more efficiently mixed with the mass of oil and whereby it may to some extent assist in the agitating of the material being treated.

Having thus described my invention, what I claim as new and desire to protect by Letters Patent is:

1. In an apparatus for treating hydrocarbon oils, an agitating tank, oil inlet and outlet pipes connected thereto, agitating pipes secured in said tank, air-conducting pipes connected to said tank and positioned to discharge air into one end of each of said agitating pipes, said air-conducting pipes being connected respectively to hot and cold air supplies, and a connecting valve-controlled pipe between said air pipes to allow regulation of the temperature of said air.

2. In an apparatus for treating hydrocarbon oils, an agitating tank, oil inlet and outlet pipes connected thereto, agitating pipes secured in said tank, air-conducting pipes connected to said tank and positioned to discharge air into one end of each of said agitating pipes, said air-conducting pipes being connected respectively to hot and cold air supplies, a connecting pipe between said air pipes to allow regulation of the temperature of said air, and valves and outlets on said air pipes arranged so that the temperature of the air may be regulated before it is turned on to said agitating tank.

3. In an apparatus for treating hydrocarbon oils, an agitating tank, oil inlet and outlet pipes connected thereto, agitating pipes secured in said tank, air conducting pipes positioned to permit the discharge of air into one end of each of said agitating pipes, means to permit regulation of the temperature of said air, and means to discharge air from said air pipes outside said tank until the temperature is suitably regulated.

4. In an apparatus for treating hydrocarbon oils, an agitating tank, oil inlet and outlet pipes connected thereto, open pipes secured therein, pipes for hot and cold air connected to said tank and positioned to discharge heated air into said open pipes, and means to permit regulation of the temperature of the air to the desired point before it is discharged into said tank.

5. In an apparatus for treating hydrocarbon oils, an agitating tank, oil inlet and outlet pipes connected thereto, means to discharge air into said tank, means whereby the temperature of said air may be regulated, pipes in said tank to receive said air and by the action of said air to draw successive small quantities of the oils into contact with said air, and means to condense the volatile material arising from said oil and means to discharge said condensed material with said air into the oil in said tank.

6. In an apparatus for treating hydrocarbon oils, an agitating tank, oil inlet and outlet pipes connected thereto, means to discharge air into said tank, means whereby the temperature of said air may be suitably regulated, means to condense the volatile material arising from the treated oil, and means actuated by said air-discharge to force said condensed volatile material back into said oil.

7. In an apparatus for treating hydrocarbon oils, an agitating tank, oil inlet and outlet pipes connected thereto, means to permit the discharge of air into said tank, means whereby the temperature of said air may be regulated, means to condense volatile material arising from said oil, a container to receive said condensed material and means between said container and said air-discharge means to conduct said condensed material into said air-discharge means in the manner and for the purpose described.

8. In an apparatus for treating hydrocarbon oils, an agitating tank, oil inlet and outlet pipes connected thereto, means to discharge heated air into said tank, means to condense volatile material arising from said oil, a container for said condensed material and means connecting said container and air-discharge so that the air-discharge will draw said condensed material therefrom and discharge it into said tank.

9. In an apparatus for treating hydrocarbon oils, an agitating tank, oil inlet and outlet pipes connected thereto, air discharge pipes connected therewith, a condenser connected with said tank to act on the volatile material from said tank, a container to receive the condensed volatile material, and injector means in one of said air-discharge pipes to draw said condensed material from said container and discharge it with said air into said tank.

In testimony whereof, I hereunto affix my signature, this the 17th day of November, A. D., 1920.

JOHN P. PERSCH.